(12) United States Patent
Couderc et al.

(10) Patent No.: US 8,867,576 B2
(45) Date of Patent: *Oct. 21, 2014

(54) GENERATOR AND LASER SYSTEM COMPRISING COUPLED SUB-CAVITIES

(75) Inventors: Vincent Couderc, Verneuil/Vienne (FR); Philippe Paul Leproux, Saint Pardoux (FR); Florent Doutre, Limoges (FR); Dominique Pagnoux, Limoges (FR)

(73) Assignees: Centre National de la Recherche Scientifique-CNRS, Paris Cedex (FR); Compagnie Industrielle des Lasers Cilas (CILAS), Orleans (FR)

( * ) Notice: Subject to any disclaimer, the term of this patent is extended or adjusted under 35 U.S.C. 154(b) by 185 days.

This patent is subject to a terminal disclaimer.

(21) Appl. No.: 13/378,774

(22) PCT Filed: Jun. 17, 2010

(86) PCT No.: PCT/FR2010/051216
§ 371 (c)(1),
(2), (4) Date: Mar. 12, 2012

(87) PCT Pub. No.: WO2010/146316
PCT Pub. Date: Dec. 23, 2010

(65) Prior Publication Data
US 2012/0170606 A1 Jul. 5, 2012

(30) Foreign Application Priority Data
Jun. 19, 2009 (FR) .................................. 09 02987

(51) Int. Cl.
*H01S 3/093* (2006.01)
*H01S 3/082* (2006.01)
(Continued)

(52) U.S. Cl.
CPC .................. *H01S 3/082* (2013.01); *H01S 3/117* (2013.01); *H01S 3/08013* (2013.01); *H01S 3/113* (2013.01); *H01S 3/108* (2013.01); *H01S 3/0627* (2013.01); *H01S 3/2383* (2013.01)

USPC .................................. 372/17; 372/97; 372/72

(58) Field of Classification Search
USPC ....................................................... 372/17, 97
See application file for complete search history.

(56) References Cited

U.S. PATENT DOCUMENTS 4,019,156 A * 4/1977 Fountain et al. ................. 372/18
4,982,405 A 1/1991 Zayhowski et al.
(Continued)

FOREIGN PATENT DOCUMENTS

EP 0742613 A1 11/1996

OTHER PUBLICATIONS

Couderc et al., U.S. Appl. No. 13/378,774, Jun. 25, 2013 claim set.*
(Continued)

*Primary Examiner* — Yuanda Zhang
*Assistant Examiner* — Michael Carter
(74) *Attorney, Agent, or Firm* — Bachman & LaPointe, P.C.

(57) ABSTRACT

A laser system having a cavity formed by at least two sub-cavities and a mechanism for optically pumping a first of the at least two sub-cavities. In the system, the optical pumping mechanism is arranged in such away to not reach a laser emission threshold of the first sub-cavity, the first sub-cavity (2) comprising a device for generating a short pulse, a second sub-cavity (3) comprising an external triggering device. The first and second sub-cavities are coupled such that the triggering of the second sub-cavity has at least two such laser systems, to a light emission system with a wide spectral band, comprising such a laser system and a mechanism for generating non-linear optical effects inserted into the second sub-cavity, and to a light generator with a wide spectral band, comprising such a laser generator having at least one laser system provided with a mechanism for generating non-linear optical effects inserted into the second sub-cavity.

16 Claims, 3 Drawing Sheets

(51) Int. Cl.
*H01S 3/117* (2006.01)
*H01S 3/08* (2006.01)
*H01S 3/113* (2006.01)
*H01S 3/108* (2006.01)
*H01S 3/06* (2006.01)
*H01S 3/23* (2006.01)

(56) References Cited

U.S. PATENT DOCUMENTS 5,119,384 A * 6/1992 Chikuma .................. 372/21
5,381,431 A * 1/1995 Zayhowski ................ 372/25
5,828,680 A 10/1998 Kim et al.
5,832,010 A * 11/1998 Fulbert et al. ............. 372/22
2008/0247425 A1 10/2008 Welford

OTHER PUBLICATIONS

B. Hansson et al.; Q-Switched Microchip Laser with 65ps Timing Jitter; Electronics Letters, IEE Stevenage, GB, vol. 36, No. 13, Jun. 22, 2000; pp. 1123-1124, XP006015384.

* cited by examiner

GENERATOR AND LASER SYSTEM COMPRISING COUPLED SUB-CAVITIES

TECHNICAL FIELD OF THE INVENTION

The present invention relates to the field of laser sources producing sub-nanosecond duration pulses.

More particularly, it relates to a laser system including a cavity formed by at least two sub-cavities and to means for optically pumping a first one amongst these at least two sub-cavities. It also relates to a laser generator including at least two of such laser systems.

PRIOR ART

The prior art in this field comprises laser sources suitable for producing generally monochromatic or quasi-monochromatic radiations. Such sources use cavities operating in the so-called "Q-SWITCH" passive trigger mode.

An example of such laser source is described in US patent document 2008/0247425 A1. In this document, a passively triggered monolithic micro-laser comprises a laser cavity formed of a gain medium and a saturable absorber, arranged between two dielectric layers. A pump beam illuminates the gain medium through a first dielectric layer, which causes an excitation of the ions and energy stored in the gain medium. Owing to the fact that energy inside the gain medium increases and that the intra-cavity intensity at the wavelength of the micro-laser also increases, the absorber becomes saturated, which leads to a rapid extraction of part of the energy stored in pulse form. After emission of the pulse, the absorber is no longer saturated for a certain length of time, before becoming saturated again and causing the emission of a new pulse. The frequency of recurrence of the pulses is thus given by the physical properties of the saturable absorber and the gain medium.

Nevertheless, such a source presents the drawback of exhibiting a significant time jitter, typically of about a microsecond.

A dual cavity and trigger laser is provided in U.S. Pat. No. 4,982,405, which describes a laser including a cavity formed by two resonant sub-cavities. The first sub-cavity includes a gain medium and is illuminated by a pump beam. The second sub-cavity includes a non-linear medium and is illuminated by a second incident laser beam. These two sub-cavities are adjacent and are coupled by the set-up of a joint partially reflecting mirror. The length of the optical path of the second sub-cavity is adjusted so as to influence the Q factor of the first sub-cavity containing the gain medium.

This solution does not make it possible however to generate a monochromatic pulse emission lower than a nanosecond and which is at the same time stable and free from temporal jitter.

SUMMARY OF THE INVENTION

The purpose of this invention is to remedy to this technical problem, by arranging two of the sub-cavities so as to form a passive sub-cavity including a passive trigger, insufficiently pumped so as to generate a luminous pulse, and an active sub-cavity incorporating an active trigger coupled with the passive sub-cavity in order to cause the release of the luminous pulse.

The approach of the solution consisted in seeking to combine the advantages of the passive type triggers (generation of short pulses) and of the active type triggers (low temporal jitter) in order to solve the problem of the temporal jitter of the micro-lasers producing pulses of subnanosecond duration. The initially intended application concerned flow cytometry cellular diagnosis, for which it is necessary to temporally synchronize a test laser pulse with a cell being spread in front of an analysis window.

Passive triggers (of saturable absorbing type) have the special feature of generating short pulses when introduced into very short cavities (laser micro cavity with sub-centimetric dimensions). Unfortunately, upon trigger, their temporal jitter is large. The active triggers are cumbersome and, contrary to the passive triggers, generate longer pulses but have a low temporal jitter.

Thus, one aim of the invention is to simultaneously use these two systems while preserving their characteristics and their environment. This implementation results in their integration in a very short cavity, which is currently impossible because of their encumbrance.

The use of two coupled cavities makes it possible to solve this problem. Nevertheless, the characteristics of the laser system must be such that the active cavity has the potentiality to trigger the passive cavity. The passive cavity then forms the short pulse without significant influence of the first cavity after triggering. For this reason, it is recommended to have a very short passive cavity and a very long active cavity so that at least a longitudinal mode of the active cavity can oscillate within the passive cavity.

To achieve these goals, one object of the present invention is a laser system comprising a cavity formed of two sub-cavities and means for optically pumping a first one of said at least two sub-cavities. In this system, the optical pumping means are arranged so as not to reach the laser emission threshold of the first sub-cavity. This first sub-cavity includes means for generating a short pulse. A second sub-cavity includes external triggering means. These first and second sub-cavities interferometrically coupled such that the active triggering of this second sub-cavity causes the release of the short pulse generated by this first sub-cavity.

The first and second sub-cavities act as modules coupled one to each other in a predetermined manner in order to dissociate the formation of a high energy pulse thanks to a microcavity and the amplification of this pulse. These two modules being integrated within a single resonator, their cascading promotes the generation of sub-nanosecond and high energy laser pulses without temporal jitter compared to an external triggering signal.

More specifically, the first sub-cavity is not sufficiently optically pumped to reach by itself the laser emission threshold of the cavity. The second sub-cavity comprises external triggering means which allows, thanks to the coupling between both sub-cavities, the triggering of a short duration luminous pulse. This, both active and passive, triggering of the laser cavity makes it possible to reach recurrence frequencies between 0 and 150 kHz and to obtain sub-nanoseconds pulse durations without temporal jitter Thus, by combining a saturable absorber—generating short pulses but with a temporal jitter—and an active triggering—generating long pulses without temporal jitter—, it is possible to obtain a pulse laser source able to generate short pulses having a negligible temporal jitter.

Preferably, the first sub-cavity comprises a gain medium, in order to amplify the light emitted by the pumping means of this sub-cavity, without however reaching the laser emission threshold of the cavity.

Preferably, the means for generating a short pulse comprise a saturable absorber. This type of element is in fact particularly adapted to the accumulation of luminous energy for a limited duration, to then release it following a triggering in order to generate pulses of short duration.

It is also advantageous that the second (active) sub-cavity comprises a gain medium in order to amplify the light signal from the first sub-cavity.

According to a particular embodiment of the second sub-cavity, the external triggering means comprise an acousto-optic modulator.

Preferably, the two sub-cavities of the system comprise, at each of their ends, means for partially reflecting light. As such, a particularly advantageous alternative embodiment consists in using Bragg mirrors as partial reflecting means.

According to a particular embodiment, the coupling of the two sub-cavities is carried out by arranging a partial reflection means which is common to said two sub-cavities.

Preferably, the optical pumping means are arranged so as to be substantially close to the laser emission threshold of the said first sub-cavity without reaching it. The temporal jitter is in fact even weaker the farther we get from the emitting threshold and it is possible to pass way above this threshold with the action of the second active sub-cavity.

In order to trigger in a synchronized manner the departure of a short pulse, the external triggering means can be controlled by a synchronization signal.

According to a particular embodiment, the laser system comprises frequency conversion means. Such a system makes it possible to generate other frequencies than that set by the nature of the laser medium.

In the latter case, the frequency conversion means may be provided as a non-linear optical fiber.

According to an advantageous embodiment, the second sub-cavity has a longitudinal dimension greater than that of the first sub-cavity, and preferably much greater (for example ten-fold), which makes it possible to have at least an oscillating longitudinal mode in the second sub-cavity which is also able to oscillate in the first sub-cavity.

The present invention also relates to a laser generator including at least two laser systems as described above.

According to a particular embodiment, the second sub-cavities of at least two laser systems comprise a common partial reflecting means, which makes their coupling possible.

In order to synchronize at least two laser systems with each other, the generator can comprise means for synchronizing the pumping means of at least two laser systems.

In this case, in a first alternative the synchronization means is arranged in order to perform a time synchronization of the light pulses output from the corresponding pumping means, which makes it possible to increase the light power of the generator.

In a second alternative the synchronization means is arranged so as to perform a time desynchronization of the light pulses output from the corresponding pumping means, which makes it possible to increase the recurrence frequency of the generator.

According to a particular embodiment, the second sub-cavities of at least two laser systems exhibit a common external triggering means.

BRIEF DESCRIPTION OF THE DRAWINGS

Other characteristics and advantages of the invention will become apparent upon reading of the following specification, with reference to the accompanying drawings, in which.

For the sake of clarity, identical or similar elements are designated by identical reference characters throughout the figures.

DETAILED DESCRIPTION OF AN EMBODIMENT

Figure 1:
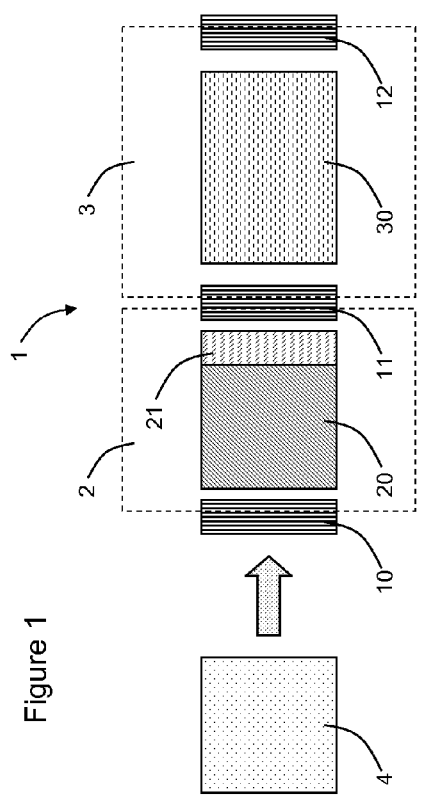
FIG. 1, is a diagram representing a laser system according to a first embodiment of the invention.

With reference to FIG. 1, a laser system 1 according to a first embodiment of the invention comprises a cavity formed of two sub-cavities 2 and 3 coupled to each other. More than 2 sub-cavities may be arranged in this cavity without departing from the scope of the present invention.

The coupling between cavities is of an interferometric type meaning that, as it will be apparent upon reading the following specification, the coupling operates on the same wavelength and can lead to losses related to the phase superposition, or not, of the various components of the laser radiation. Thus, the modification of a parameter of one of the cavities requires a change in the other cavities.

The first sub-cavity 2 comprises a gain medium 20 and a passive saturable absorber 21. According to an alternative embodiment, these two elements 20 and 21 may be made in a single component. The microchip 20 can be a YAG 1.1% type microlaser and the saturable absorber 21 can be a CR4+ (absorber) abs 3 cm$^{-1}$.

This first sub-cavity 2 also comprises two Bragg mirrors 10 and 11, arranged at each end of the sub-cavity.

The second sub-cavity 3 comprises an external trigger 30 surrounded by two Bragg mirrors 11 and 12.

The coupling of both sub-cavities 2 and 3 takes place by the common arrangement of the Bragg mirror 11, the latter being at an end of the first sub-cavity 2 and at the other end of the second sub-cavity 3. The Bragg mirrors 10 and 12—at the two other ends of both sub-cavities—thus, constitute the two mirrors surrounding the main cavity.

The laser system 1 according to this embodiment comprises means 4 for optically pumping the first sub-cavity 2. It is arranged facing this sub-cavity in order not to reach the laser emission threshold of the cavity, while being substantially close.

Owing to the coupling of the two sub-cavities, the saturable absorber 21 of first sub-cavity 2 can store the luminous pumping energy and release it only under the effect of the external triggering operated by the trigger 30 of the second sub-cavity 3, so as to reach the laser threshold of the cavity. Thus, the generation of a luminous pulse of short duration and strong energy, controlled by an external trigger to the pumped sub-cavity, is obtained. The operating frequency of the trigger 30 thus determines the emission frequency of the luminous pulses from the laser system 1. The duration of the generated optical pulse is determined by the length of cavity 1 and by the type of saturable absorber positioned therein.

The active triggering of the second cavity, by trigger 30, thus causes the passive triggering by saturating the saturable absorber 21, of the first sub-cavity.

For example, the external trigger 30 may be:
 a modulator, for example of an AOM type (acousto-optic), EO (electro-optical), MOEMS (micro-opto-electro-mechanical) type, etc, another laser, for example a microlaser with short pulses, or a picosecond laser diode.

For example, for a pump diode 4 exhibiting a maximum emission at a wavelength of 808 nanometers and a mean power of 3 Watts, a mirror 10 whose reflection maximum is around 1064 nanometers and reflection minimum around 808 nanometers, a mirror 11 whose reflection coefficient is about 87% and a mirror 12 whose reflection coefficient is about 95% may be used. A temporal jitter of about a hundred picoseconds can then be obtained.

According to an advantageous alternative, the second sub-cavity 3 can also comprise a gain medium in order to amplify the light signal and thus obtain a higher luminous energy density.

According to another advantageous alternative, several systems can be set in cascade with the laser system according to the invention, in order to carry out an increase in luminous power.

According to an advantageous embodiment, the second sub-cavity has a longitudinal dimension greater than that of the first sub-cavity, and preferably much greater (for example by a factor equal to or higher than 10), which makes it possible to have at least an oscillating longitudinal mode in the second sub-cavity which is also able to oscillate in the first sub-cavity.

Figure 2:
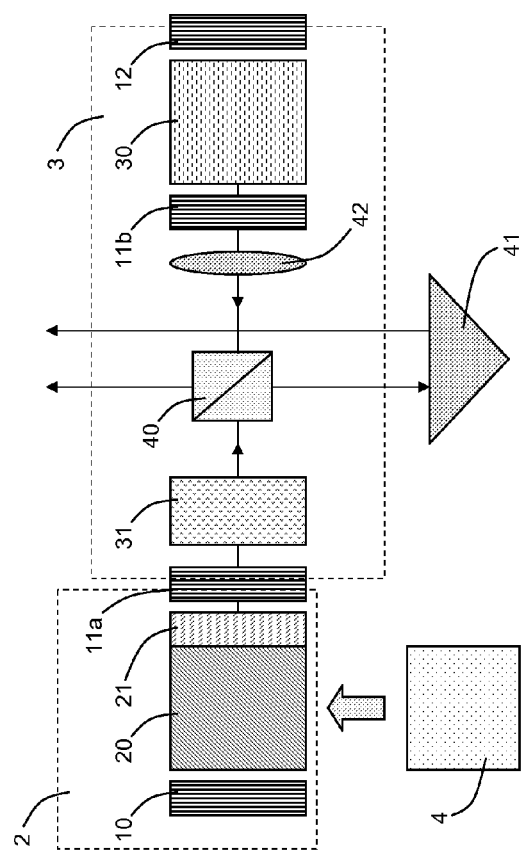
FIG. 2, is a diagram representing a laser system according to a second embodiment of the invention.

Now, a second embodiment of the invention is described, with addition of a non-linear medium in order to carry out a broadband spectrum light emission system with reference to FIG. 2.

Herein, the laser system comprises two sub-cavities 1 and 2. The coupling between these two sub-cavities is no longer ensured by the arrangement of a common mirror to both sub-cavities, but by arranging their mirrors 11a and 11b in the same axis.

The system also comprises, in the second sub-cavity 3, a non-linear element 31, a polarizer 40, a reflecting element 41 (optional, in order to reflect the beam towards a light power counter) and a half-wave plate 42.

The non-linear element 31 makes it possible to spread the spectrum of the central light pulse oscillating in the cavity, without interfering with the formation of the pulse. This element can be made up of fibers or crystals. It makes it possible to provide a broad spectrum in the infra-red or visible field while maintaining a pulse duration of a few hundred picoseconds.

This embodiment incorporating a second laser formed by elements 11b, 30 and 12 makes it possible to improve the triggering of the first cavity by more easily saturating its gain medium with the contribution of external optical energy. This makes it possible to more easily monitor the temporal jitter of the first cavity. Elements 40 and 42 together produce a power controller making it possible to proportion the quantity of energy sent towards the cavity 1.

An intra-cavity continuum may thus be obtained in a stable "Q-SWITCH" mode. This broadband spectrum is generated in the amplifying cavity (i.e., sub-cavity 3), therefore in a cavity external to the laser cavity (sub-cavity 2).

The following examples relate to various embodiments of a laser generator in accordance with the invention, i.e., formed by at least two laser systems according to the invention.

Figure 3:
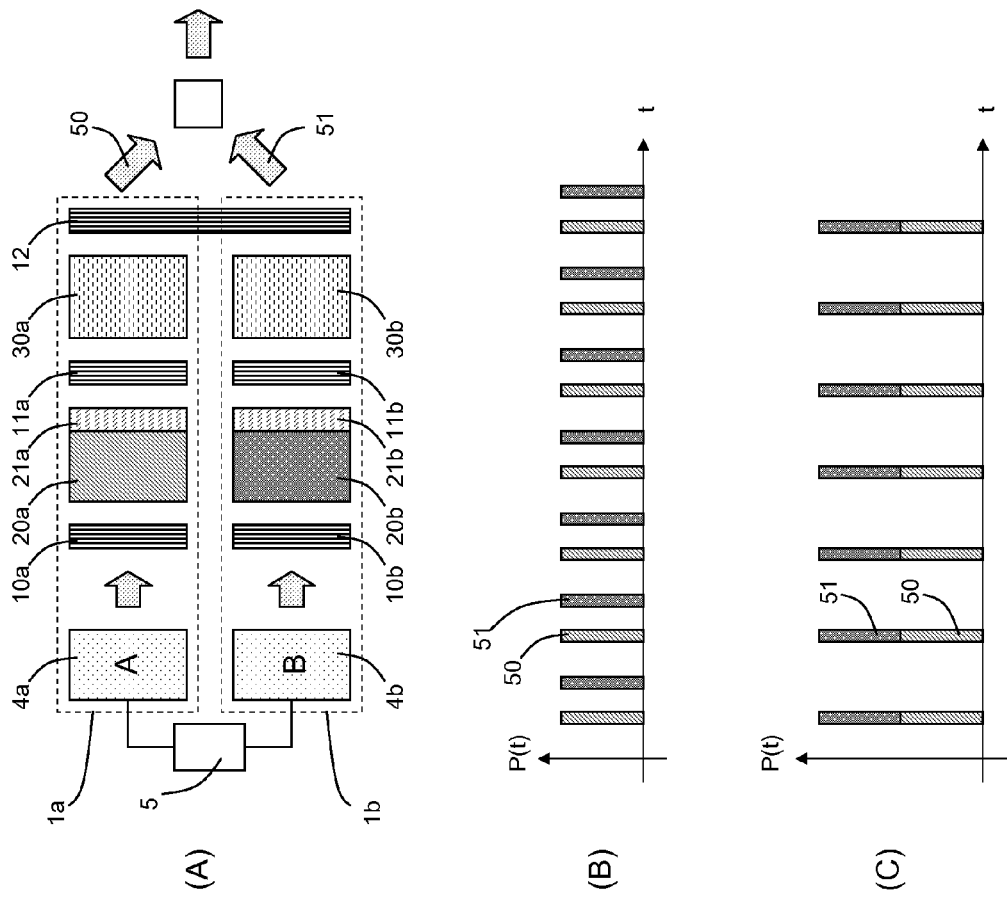
FIGS. 3A to 3C, are diagrams representing two alternatives of a laser generator according to a first embodiment of the invention.

According to the embodiment illustrated by FIG. 3A, a laser generator comprises two laser systems 1a and 1b, adjacent with respect to each other.

These two laser systems 1a and 1b respectively comprise:
optical pumping means 4a and 4b,
mirrors 10a, 11a and 10b, 11b,
gain mediums 20a and 20b,
saturable absorbers 21a and 21b,
external triggers 30a and 30b.

The final mirror 12 is common to both laser systems 1a and 1b. Gain mediums 20a and 20b, as well as saturable absorbers 21a and 21b, exhibit identical physical features. In another alternative embodiment, their physical features may be different.

Each of the two laser systems output pulses with a certain recurrence period. In the case where all constituting components of the laser systems are similar among the systems, the pulse durations, as well as their recurrence periods and their powers are identical.

Both output beams 50 and 51, respectively output from the first and the second laser systems, are then superimposed.

A synchronization means 5 is connected to both pumping means 4a and 4b, in order to synchronize the pump beams output therefrom. Various synchronization types are then possible, in particular:
  the synchronization means are arranged to temporally desynchronize the light pulses output from both corresponding pumping means (FIG. 3B): the light pulses 50 and 51 (respectively output from systems 1a and 1b) are thus shifted by one duration corresponding, for example, to the recurrence half-period of one of both systems, and the recurrence frequency of the generator is thus doubled, or
  the synchronization means is arranged to temporally synchronize the light pulses output from the two corresponding pumping means (FIG. 3C): the light pulses 50 and 51 are then superimposed, and the power of the generator is thus doubled.

Other alternatives may be implemented according to this schema, with various types of synchronization and more than two laser systems synchronized with each other.

Figure 4:
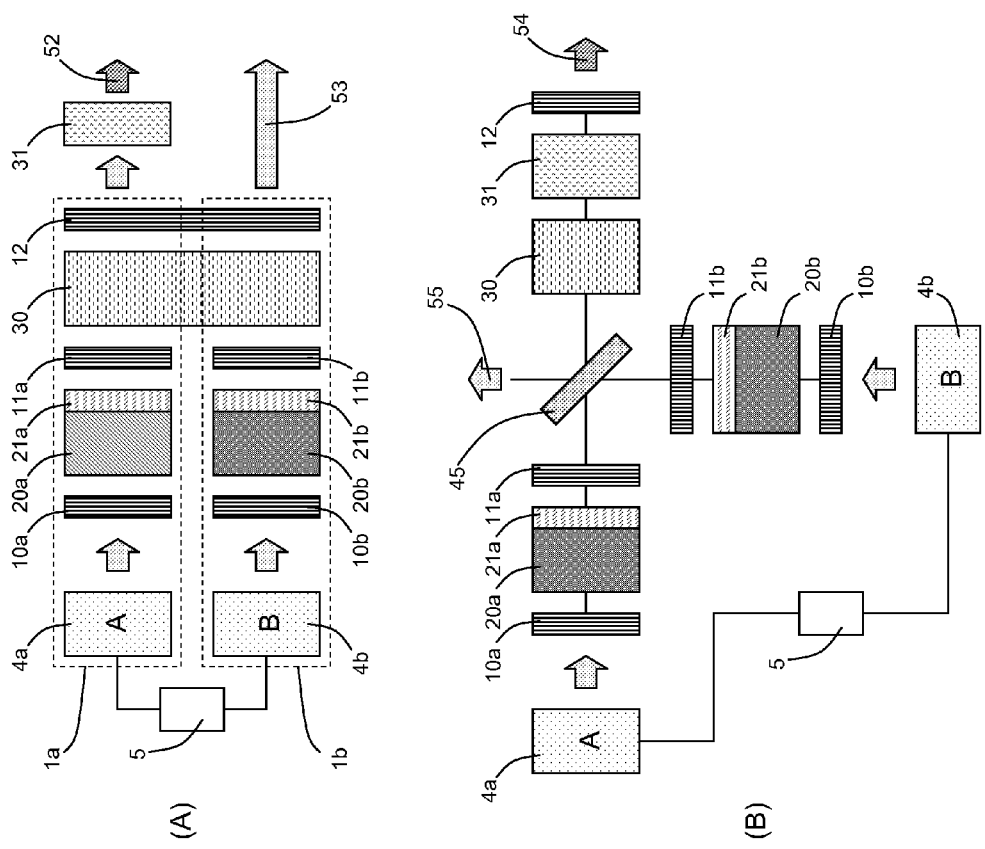
FIGS. 4A and 4B, are diagrams representing two alternatives of a laser generator with a non-linear crystal according to a second embodiment of the invention.

According to the embodiment illustrated by FIG. 4A, a laser generator comprises two laser systems 1a and 1b, adjacent with respect to each other, and operating in parallel.

The optical pumping means 4a and 4b, the mirrors 10a, 11a and 10b, 11b, the gain mediums 20a and 20b and the saturable absorbers 21a and 21b are identical to those of the embodiment illustrated in FIG. 3A. Both laser systems 1a and 1b comprise an external trigger 30 and a final common mirror 12. A synchronization means 5 is also connected to both pumping means 4a and 4b, in order to synchronize the pump beams output therefrom.

On the path of the laser beam output from the first laser system 1a a non-linear element 31 is arranged as described in the embodiment illustrated by FIG. 2. This element 31 makes it possible to widen the spectrum of the output laser beam, in order to obtain an impulsional and broad spectral field output beam 52. The output laser beam 53 from the second laser system 1b remains unmodified.

Thus, two output beams 52 and 53 are obtained, one of which one is a broad spectrum beam and the other one a quasi-monochromatic beam, these two beams being synchronized with respect to each other, which is, for example, advantageous for applications such as spectral signature detection of CARS type particles (Coherent Anti-Stokes Raman Scattering).

According to the embodiment illustrated by FIG. 4B, a laser generator comprises two laser systems, adjacent to each other, and operating in cascade.

The components of both laser systems used are identical to those described in the preceding embodiment with reference to FIG. 4A. In particular, both laser systems exhibit an external trigger 30 and a final common mirror 12. The other elements are located at 90° with respect to each other, and on the same side of a semi-reflective plate 45, each one at 45° therefrom. A synchronization means 5 is also connected to both pumping means 4a and 4b.

The external trigger 30, the nonlinear element 31 and the common mirror 12 are located on the other side of plate 45, at 45° therefrom. Lastly, a last portion, at 90° from elements 30, 31 and 12, and at 45° from plate 45, does not comprise any element.

In a way similar to the embodiment of FIG. 4A, two output beams 54 and 55, are obtained, one of which has a broad spectrum (54) and the other one is quasi-monochromatic (55), these two beams being synchronized with respect to each other. The difference with the embodiment of FIG. 4A is that here, the laser systems are set in cascade, since the light beams are superimposed at blade 45, 50% of the light constituting beam 55 and the 50% constituting beam 54. In the preceding embodiment, in parallel, each beam was from one of the two laser systems.

The previously described embodiments of this invention are given by way of examples and are in no way limitative. It is obvious that a person skilled in the art is capable of carrying out various alternatives of the invention without departing from the scope of the patent.

In particular, various embodiments can be implemented according to the considered application, for example broad spectral field laser sources for biophotonic experiments, spectroscopy applications, application for material characterization in terms of transparency or dispersion, etc.

The invention claimed is:

1. A laser system comprising a cavity formed of two sub-cavities and means for optically pumping a first sub-cavity of said at least two sub-cavities, said optical pumping means are arranged so as not to reach a laser emission threshold of the first sub-cavity, said first sub-cavity including means for generating a short pulse, said means for generating a short pulse comprises a gain medium and a saturable absorber, a second sub-cavity of said at least two sub-cavities including external triggering means, and said first and second sub-cavities are interferometrically coupled, such that active triggering of said second sub-cavity causes the release of a short pulse generated by said first sub-cavity.

2. The laser system according to claim 1, wherein the second sub-cavity comprises a gain medium.

3. The laser system according to claim 1, wherein the external triggering means comprise an acousto-optic modulator.

4. The laser system according to claim 1, wherein both sub-cavities comprise partial light reflecting means at each of their ends.

5. The laser system according to claim 4, wherein the partial reflecting means are Bragg mirrors.

6. The laser system according to claim 5, wherein the coupling of the two sub-cavities is carried-out by arranging a partial reflecting means common to said two sub-cavities.

7. The laser system according to claim 1, wherein the optical pumping means are arranged so as not to reach the laser emission threshold of said first sub-cavity while being substantially close thereto.

8. The laser system according to claim 1, wherein the external triggering means are capable of being controlled by a synchronization signal.

9. The laser system according to claim 1, further comprising frequency conversion means.

10. The laser system according to claim 9, wherein the frequency conversion means are provided as a non-linear optical fiber.

11. The laser system according to claim 1, wherein the second sub-cavity has a longitudinal dimension greater than a longitudinal dimension of the first sub-cavity.

12. A laser generator comprising at least two laser systems, each of the at least two laser systems including a laser system comprising a cavity formed of two sub-cavities and means for optically pumping a first sub-cavity of said at least two sub-cavities, said optical pumping means are arranged so as not to reach a laser emission threshold of the first sub-cavity, said first sub-cavity including means for generating a short pulse, said means for generating a short pulse comprises a gain medium and a saturable absorber, a second sub-cavity of said at least two sub-cavities including external triggering means, and said first and second sub-cavities are interferometrically coupled, such that active triggering of said second sub-cavity causes the release of a short pulse generated by said first sub-cavity, wherein the second sub-cavities of at least two laser systems comprise a common partial reflecting means.

13. The laser generator according to claim 12, comprising means for synchronizing the pumping means of said at least two laser systems.

14. The laser generator according to claim 13, wherein the synchronization means is arranged to perform a time synchronization of the light pulse output from the corresponding pumping means.

15. The laser generator according to claim 14, wherein the synchronization means is arranged to perform a time desynchronization of the light pulse output from the corresponding pumping means.

16. The laser generator according to claim 12, wherein the second sub-cavities of said at least two laser systems comprise a common external triggering means.

* * * * *